March 21, 1933. H. V. HUGHES 1,902,449
COMBINED POSITIVE DRIVE WITH DIFFERENTIAL
CHARACTERISTICS AND FREE WHEELING
Filed Dec. 8, 1931 2 Sheets-Sheet 1
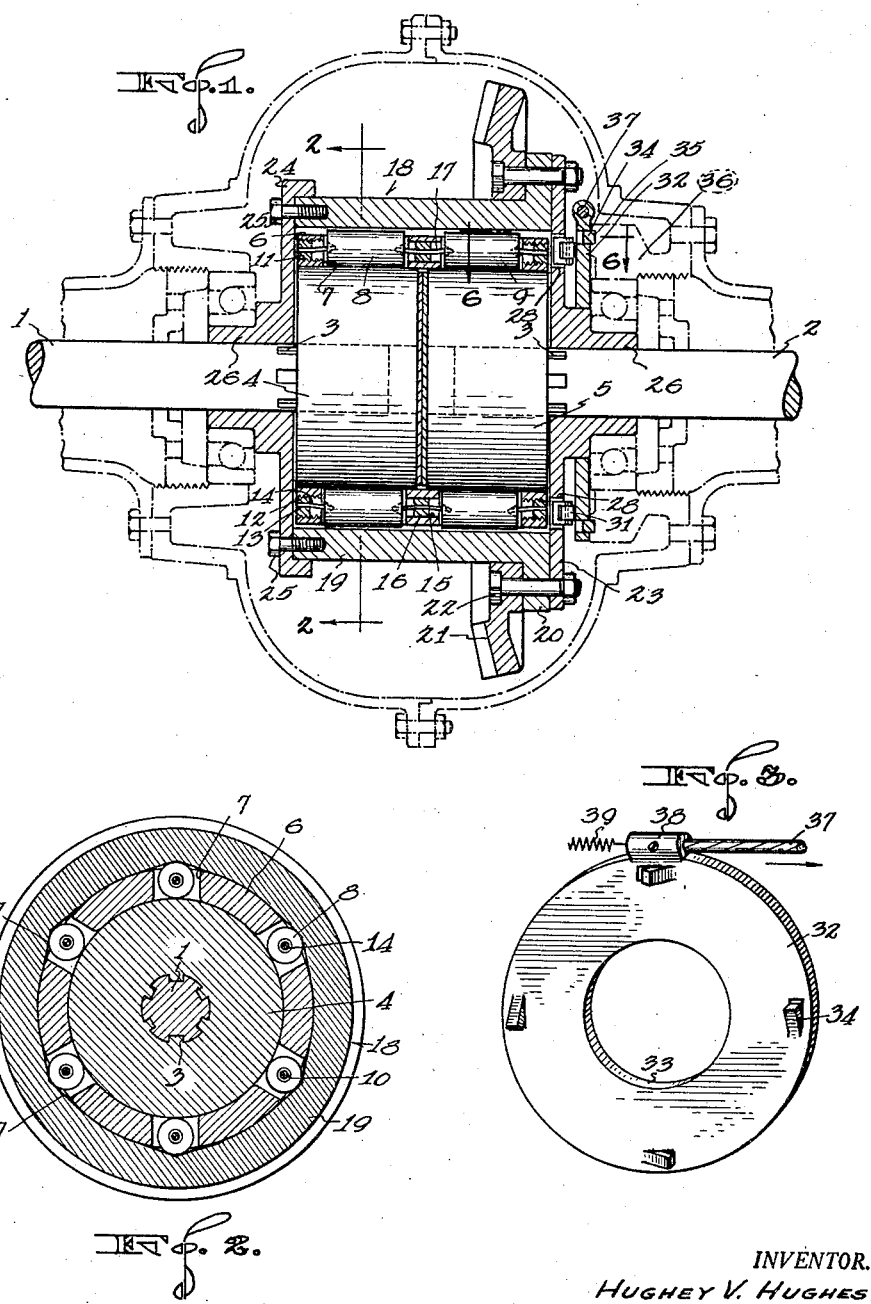
INVENTOR.
HUGHEY V. HUGHES.
BY Munn+Co
ATTORNEYS.

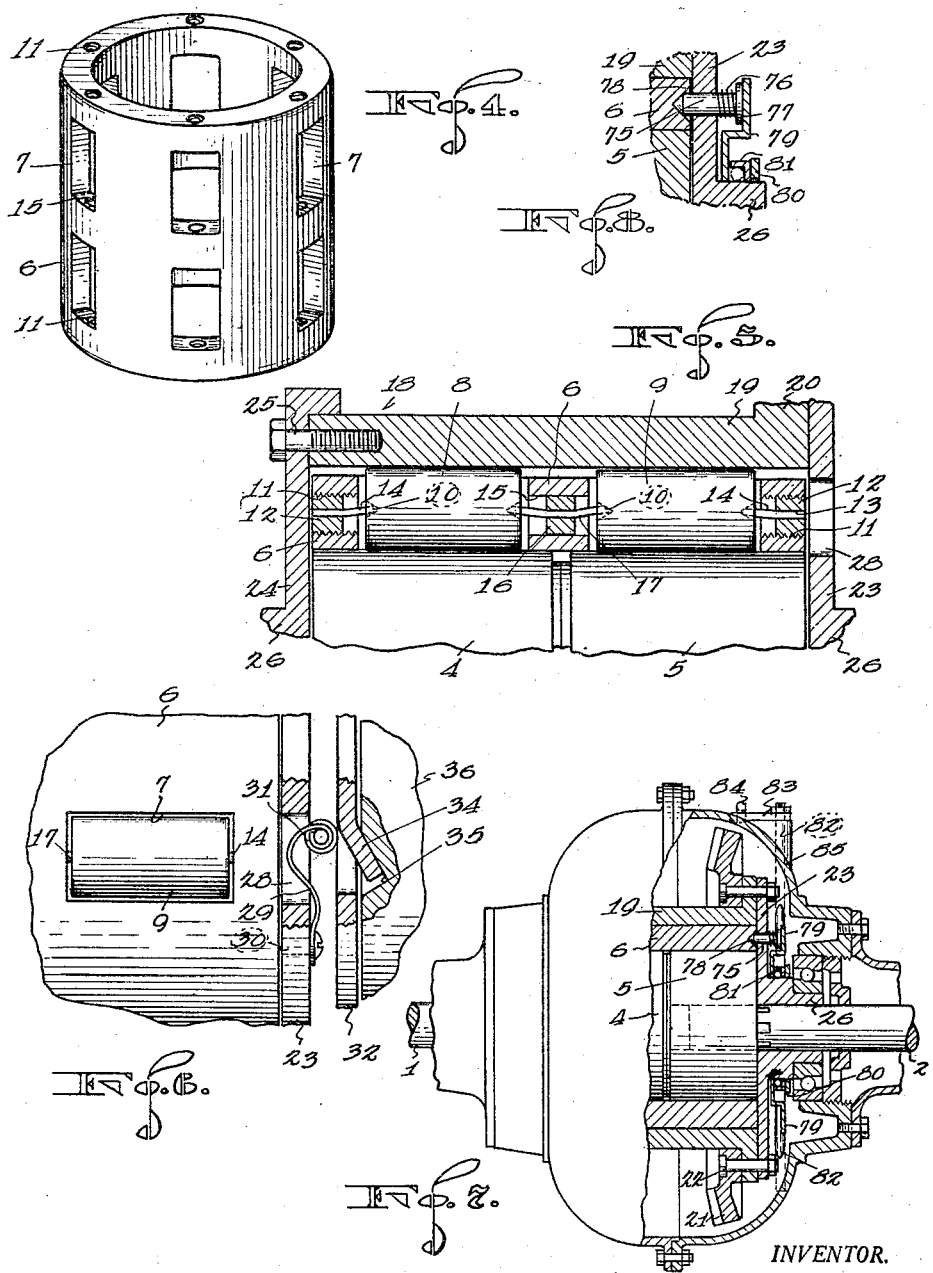

Patented Mar. 21, 1933

1,902,449

UNITED STATES PATENT OFFICE

HUGHEY V. HUGHES, OF OAKLAND, CALIFORNIA, ASSIGNOR OF ONE-HALF TO JOHN A. WEAVER, OF OAKLAND, CALIFORNIA

COMBINED POSITIVE DRIVE WITH DIFFERENTIAL CHARACTERISTICS AND FREE-WHEELING

Application filed December 8, 1931. Serial No. 579,804.

My invention relates to improvements in combined positive drives with differential characteristics and free wheeling, and it consists of the combinations, constructions and arrangements hereinafter described and claimed.

An object of my invention is to provide a combined positive drive with differential characteristics and free wheeling, in which a driving member is operatively connected to two driven axles by a control cage that has rollers for positively connecting the driving member and the driven axles together, regardless of the direction of rotation of the driving member. One of the principal features of the invention lies in the fact that the rollers in the control cage are yieldingly held against the driven axles, whereby an initial rotative movement of the driving member in either direction will cause this member to move with respect to the control cage instead of carrying the control cage therewith, and this relative movement between the driving member and the control cage will cause the rollers to move into a binding contact between the driving member and the driven axles.

The device has differential characteristics in that when the vehicle to which the device is attached is turning a corner, the outermost driven axle will tend to rotate faster than the inner driven axle, and this faster rotation will cause the rollers associated with the outer-driven axle to move into released position and to allow the driven axle to rotate faster than the driving member. This operation will continue so long as a turn is being negotiated. As soon, however, as the vehicle straightens out, both driven axles will be again positively connected to the driving member.

A further object of my invention is to provide novel means for connecting the control cage with the driving member at any time the operator desires, and this connection will permit the driven axles to rotate faster than the driving member and thereby accomplish free wheeling.

Other objects and advantages will appear in the following specification, and the novel features of the device will be particularly pointed out in the appended claims.

My invention is illustrated in the accompanying drawings forming a part of this application, in which Figure 1 is a vertical section through the device, showing portions in elevation;

Figure 2 is a section along the line 2—2 of Figure 1;

Figure 3 is a perspective view of a part of the device;

Figure 4 is a perspective view of the control cage;

Figure 5 is an enlarged detail view of a part of the device;

Figure 6 is a section along the line 6—6 of Figure 1;

Figure 7 shows a modified form of free wheeling control; and

Figure 8 is an enlarged view of a portion of Figure 7.

In carrying out my invention, I provide two driven axles 1 and 2, which are splined at 3 to two driven members 4 and 5, (see Figure 1). A control cage 6, of the shape shown in Figure 4, encircles the driven members 4 and 5. This cage has a plurality of openings 7 therein, and sets of rollers 8 and 9 are placed in these openings, (see Figure 5).

Each roller has a conical bore 10 at each end thereof. Threaded openings 11 extend from the ends of the control cage 6 to the openings 7, and these threaded openings receive screws 12 that have central bores 13 therein. Spring wires 14, or other suitable supporting means, are driven into the bores 13 so as to have a close fit, and these wires are received in the outermost recesses 10 in the rollers 8 and 9.

The control cage 6 also has unthreaded bores 15 that communicate with adjacent aligned openings 7, and these bores 15 slidably receive circular members 16 that in turn carry spring wires 17. The free ends of the wires 17 are received in the conical recesses 10.

It will be seen from this construction that the screws 12 may be adjusted for moving the rollers 8 and 9 longitudinally into the proper positions in the openings 7. In this way, wear can be taken up between moving parts.

One of the vital points of construction lies in the fact that the spring wires 14 and 17 are flexed so as to yieldingly hold the rollers 8 and 9 down upon the driven members 4 and 5 respectively. The control cage 6 is free to rotate on the driven members 4 and 5, but the fact that the rollers 8 and 9 are yieldingly held down upon the driven members at all times, will tend to cause the control cage to move with the driven members instead of with a driving member 18, which will now be described.

The driving member 18 is shown in Figure 1, and it will be noted that it is composed of a cylinder 19, having an outwardly-extending flange 20, to which a bevel gear 21 is secured by means of bolts 22, or other suitable fastening means.

An end plate 23 is also secured to the cylinder 19 by the bolts 22, and a second end plate 24 is secured to the cylinder 19 by cap screws 25, or other suitable fastening means. The end plates 23 and 24 have tubular portions 26, through which the driven shafts 1 and 2 extend.

The driving member may be rotated by any desired means, such as by a bevel gear, not shown, operatively connected to the bevel gear 21 and to the engine of the vehicle. In Figure 2, I show the cylinder 19 as having inclined cam V-shaped portions 27, and when the rollers 8 and 9 are received in the centers of the portions, there will be no binding action between the driving member 18 and the driven members 4 and 5. As soon, however, as the driving member 18 is rotated in either direction, it will move slightly with respect to the control cage 6 and to the driven members 4 and 5, because the control cage tends to remain stationary with the driven members 4 and 5, due to the fact that the rollers 8 and 9 are yieldingly held down upon the driven members. The least movement, however, of the driving member 18 in either direction, will cause the rollers 8 and 9 to move in the openings 7 and to wedge the driving member with the driven members. In this way, a positive connection is established between the driving member and the driven axles 1 and 2 whether the movement is forward or reverse. The spring wires 14 and 17 permit the movement of the rollers 8 and 9 into a locked position between the driving member and the driven members.

Assume now that the vehicle is taking a turn and that the driven axle 1 is on the outermost side of the vehicle. The axle 1 will tend to rotate faster than the driven member, because its wheel, not shown, is describing a greater arc.

The driven member 4 will therefore tend to rotate faster than the driving member 18, and this initial movement will free the rollers 8 from binding engagement between the driving member and the driven member 4. The rollers are free to move with respect to the cage 6, due to the elasticity of the spring wires. The driven member 4 is now free to rotate faster than the driving member 18, and the spring wires 14 and 17 will prevent movement of the rollers 8 into a locked position at the other sides of the V-shaped portions 27 on a forward motion. The free turning of the driven member 4 will continue so long as the driven axle 1 rotates faster than the driven axle 2, and the control unit 6 is held in a fixed position in relation to the driving unit 18. The rollers 8 will again lock the driving member 18 to the driven member 4 when the vehicle straightens out after making the turn. The same is true when the driven axle 2 rotates faster than the driven axle 1, either forward or reverse.

I also provide novel means for temporarily connecting the control cage 6 with the driving member 18, whereby the driven members 4 and 5 are freed and can rotate faster than the driving member. In Figure 1, I show the end plate 23 as being provided with a plurality of openings 28, and Figure 6 shows how each opening 28 receives a leaf spring 29 that is bent in the manner shown. The free end of each leaf spring carries a roller 31, and this roller contacts with a cam disc 32.

The particular shape of the cam disc 32 is shown in Figure 3, and it will be noted that the disc has a central opening 33 for receiving a portion of the tube 26. The disc 32 also has struck-up portions 34 that are inclined in the manner shown in Figure 6, and are slidably received in cam recesses 35, the latter being formed in a housing 36, forming a part of the rear axle housing. In the drawings, I have shown four cam members 34, although this number may be altered if desired.

I have also shown four leaf springs 29. A flexible cable 37, (see Figure 3), or other suitable control is connected to the disc 32 at 38. When this cable is moved in the direction of the arrow by any desired means, the disc 32 is moved through a slight arc, and this will cause the disc to move away from the housing 36, due to the fact that the cams 34 start to ride out of the cam grooves 35. The result of this transverse movement of the cam disc 32 will cause the rollers 31 to move toward the end plate 23, and the leaf springs 29 will be moved into frictional engagement with the control cage 6. As soon as this is done, the control cage is frictionally connected with the driving member.

In the operation of this part of the device, let it be assumed that the driving member 18 is rotating both driven axles 1 and 2 so as to propel the car forwardly, and that the driver wishes to temporarily free wheel. He pulls upon the cable 37 by any manually-controlled means which may be placed in the driver's compartment, and this will cause the leaf springs 29 to frictionally engage with the control cage 6 in the manner already described. The driver has taken his foot off the accelerator pedal and the engine drops down to idling speed. The result is that the driven shafts 1 and 2 will tend to rotate faster than the driving member 18. The first movement of the driven members 4 and 5 will be to move the rollers 8 and 9 into neutral position, this being permitted by the elasticity of the spring wires. The control cage will rotate at the same speed as the driving member, and the driven members 4 and 5 may rotate at any other faster speed at which they happen to be rotated. As soon as the driving member rotates faster than the driven members, the spring wires cause the rollers to lock the members together.

The driver can again connect the driving member 18 with the driven members 4 and 5 by freeing the cable 37.

A spring 39 will return the disc 32 to normal position, and the leaf springs 29 will free the cage 6 from the driving member 18. The result is that, should the driven members 4 and 5 still be rotating faster than the driving member 18, the rollers 8 and 9 will be moved so as to lock the driven members with the driving member, and the engine can be used as a braking force in stopping the momentum of the car. Should the driving member 18 be rotating faster than the rotating members 4 and 5, the rollers 8 and 9 will move in the opposite direction and will lock the driving member to the driven members.

It will be noted from Figure 2 that there is a greater amount of contacting surface between the control cage 6 and the driving member 18 than there is between the control cage 6 and the driven members 4 and 5. If it were not for the fact that the springs 14 and 17 hold the rollers down upon the driven members 4 and 5, the control cage would tend to rotate with the driving member. By constructing the device in the manner indicated, a positive action results, because the control cage will, at all times, tend to rotate with the driven members, except when the control cage is temporarily locked to the driving member by the leaf springs 29. The springs 14 and 17 not only yieldingly hold the rollers 8 and 9 down upon the driven members, but overcome centrifugal force, and will prevent the rollers from tending to move out radially when the device is operating. The springs 14 and 17 also permit transverse movement of the rollers 8 and 9 into locked position and into neutral position, and this permits one driven member 4 to free itself from the driving member, even though the other driven member is still connected to the driving member; as, for example, when the vehicle is taking a turn.

If desired, the number of rollers 8 and 9 may be varied from one up to any desired number. If one roller is used for each driven members 4 and 5, the moving of the roller into locked position will cause the portion of the driven member disposed diametrically opposite the roller to frictionally engage with the cage and to cause the cage in turn to frictionally engage with the driving member. In this way, the various parts are locked together when only one roller is used for each driven member.

In Figures 7 and 8, I show a slightly modified form of mechanism for locking the control cage 6 to the driving member 18. In place of the leaf spring 29, I provide one or more spring-pressed pins 75, these pins being carried by the end plate 23 and having springs 76 that bear against heads 77 for urging the pins outwardly. The control cage 6 has conical-shaped recesses 78 for receiving the pins 75.

A disc 79 slides on the tubular portion 26 and bears against the heads 77. A shifting fork 80 is designed to move the disc 79 toward the end plate 23 for causing the pins 75 to seat in the conical recesses 78 and thus to positively lock the cage 6 with the driving member 18. A thrust ball bearing race 81 is placed between the fork 80 and the disc 79.

In Figure 7, I show how the fork 80 is carried by a rod 82, and how this rod is turned on its axis by means of an arm 83 and an actuating member 84 that leads to the driver's compartment. The rod 82 is rotatably carried by a housing 85.

The operation of this form of the device is the same as the operation of the leaf springs 29, except that the control cage 6 is positively locked to the end plate 23 instead of being frictionally secured to the end plate. A further description of the operation is therefore not deemed necessary.

While I have shown two embodiments of my invention, it should be understood that various changes or modifications may be made within the scope of the appended claims without departing from the spirit of the invention.

I claim:

1. In combination, a driven member, a control member, a driving member, rollers having spring shafts carried by the control member for causing the rollers to yieldingly contact with the driven member, and means on the driving member and cooperating with the rollers for locking the drive and driven members together when the drive member is rotated in either direction.

2. In combination, a driven member, a control member, a roller, a spring shaft for connecting the roller to the control member and for causing the roller to yieldingly engage with the driven member, and a driving member having a cam-shaped groove for receiving a part of the roller.

3. In combination, axially-aligned driven members, a common control cage for both, a set of rollers for each member carried by the cage, spring shafts for causing the rollers to yieldingly engage with the driven members, and a driving member having a set of cam-shaped grooves for each set of rollers.

4. In combination, axially-aligned driven members, a common control cage for both, a set of rollers for each member carried by the cage, spring shafts for causing the rollers to yieldingly engage with the driven members, a driving member having a set of cam-shaped grooves for each set of rollers, and manually-controlled means for causing the control cage to rotate with the driving member, whereby the driven members are freed when the driving member rotates at a slower speed than the driven members.

5. A cylindrical control cage having openings therein, rollers disposed in said openings, and spring-supporting means for the rollers and urging the rollers toward the axis of the cage, said openings being large enough to permit a slight lateral movement of the rollers with respect to the cage, the spring supporting means permitting this movement.

6. A cylindrical control cage having openings therein, rollers disposed in said openings, spring-supporting means for the rollers and urging the rollers toward the axis of the cage, and means for adjusting the spring-supporting means for moving the rollers longitudinally into the desired positions.

7. In combination, a driven member, a control cage, rollers carried by the control cage, spring shafts for causing said rollers to yieldingly contact with the driven member, a driving member having V-shaped grooves for receiving the rollers, friction means for causing the control cage to rotate with the driving member, and manually-controlled means for actuating said friction means.

8. An article of manufacture comprising a sleeve having a plurality of openings therein, rollers placed in the openings and having conical recesses in their ends, and spring wires received in the recesses and being secured to the sleeve for supporting the rollers, said wires being inclined for urging the rollers toward the center of the sleeve.

9. In combination, two aligned driven members, a control cage encircling the members, rollers, spring means engaging with the ends of the rollers for urging them into contact with the driven members, and a driving member encircling the control cage and having cam portions for locking the rollers to the driven members, said spring means exerting sufficient inward force on the rollers to overcome centrifugal force and keep the rollers contacting with the driven members at all times.

10. In combination, two aligned driven members, a control cage encircling the members, a driving member encircling the control cage and having cam portions, rollers carried by said control cage and locking the drive and driven members together and means disposed externally of the driven members for positively locking the control cage to the driving member for freeing the rollers, whereby the driven members can rotate independently of the driving member.

11. In combination, a pair of aligned driven members, a control cage encircling the members, rollers carried by the control cage, spring means engaging with the ends of the rollers for moving them toward the driven members, a driving member having V-shaped cam portions for contacting with the rollers and causing them to lock the drive and driven members together, said spring means permitting a releasing movement of the rollers contacting with one of the driven members that tends to rotate faster than the other driven member, whereby an automatic differential action takes place.

12. In combination, two aligned driven members, a sleeve encircling the members, rollers carried by the sleeve and contacting with the driven members, and a driving member encircling the sleeve and having cam surfaces for locking the drive and driven members together, the opposed surfaces of the driven members, sleeve and driving member contacting with each other whereby the sleeve acts as a control cage, as a bearing and as a centralizing member.

13. In combination, a pair of aligned driven members, a control cage encircling the members, a driving member, cooperating means carried by the control cage and driving member for locking the drive and driven members together, a locking pin carried by the driving member, and a thrust bearing operatively connected to the pins for moving it into engagement with the control cage for locking the control cage and driving member together as a unit.

HUGHEY V. HUGHES.